F. P. BLASINGAME.
BROOM.
APPLICATION FILED APR. 1, 1920.

1,380,521. Patented June 7, 1921.

INVENTOR.
Frank P. Blasingame
BY John M. Spellman
ATTORNEY.

UNITED STATES PATENT OFFICE.

FRANK P. BLASINGAME, OF CANTON, TEXAS.

BROOM.

1,380,521.　　　　Specification of Letters Patent.　　Patented June 7, 1921.

Application filed April 1, 1920. Serial No. 370,616.

*To all whom it may concern:*

Be it known that I, FRANK P. BLASINGAME, a citizen of the United States, residing at Canton, in the county of Van Zandt and State of Texas, have invented certain new and useful Improvements in Brooms, of which the following is a specification.

My invention relates to improvements in brooms and relates more particularly to the novel construction and arrangement of such a broom.

The particular object of my invention is the provision of a broom so constructed and arranged that when the straw or a portion of the sweeping element becomes worn it may be removed from the frame and new material placed therein, the straw or sweeping material of the broom being arranged in bunches or sections. This arrangement is particularly useful to persons who raise broom corn and who can replace one or all of the bunches or sections of the straw in the broom as it becomes worn.

Another object of the invention is to provide a broom of this description which is simple in construction, very durable and which can be cheaply manufactured.

My invention will be more fully understood from the following description, taken in connection with the accompanying drawings, forming part hereof, in which—

Figure 1:
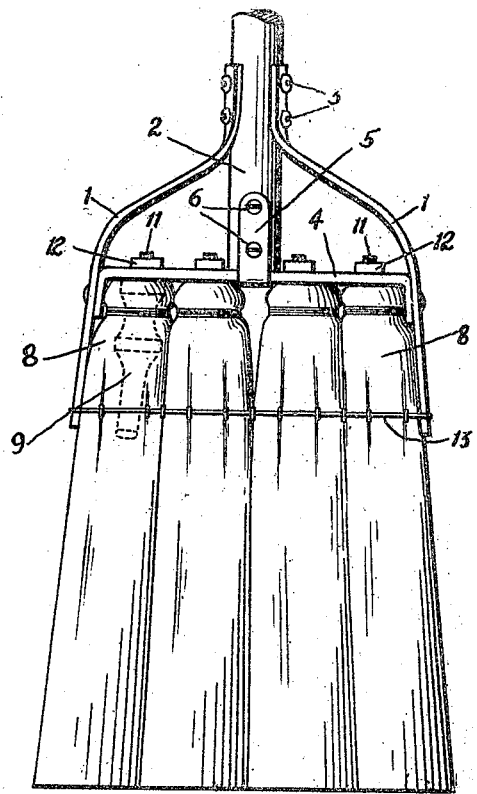
Figure 1 is a side elevational view of a broom embodying the main features of my invention.
Figure 2:
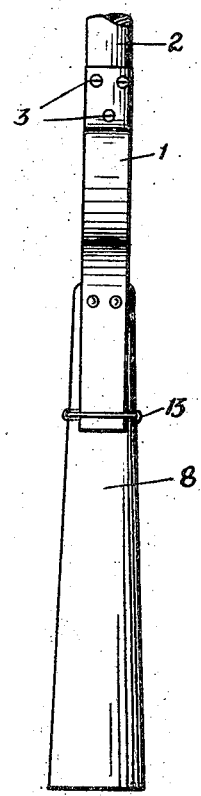
Fig. 2 is an edge view.
Figure 3:
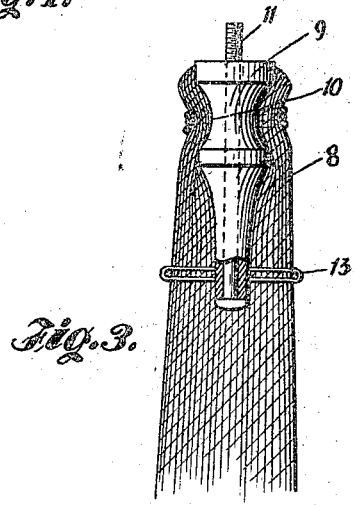
Fig. 3 is a vertical sectional view of one of the removable bunches of straw, illustrating the manner of fastening a bunch or section to its supporting finger or core.
Figure 4:
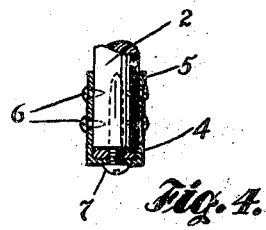
Fig. 4 is a detail sectional view, illustrating the mode of connecting the handle to the frame.

Referring more particularly to the drawings, the frame of the broom, comprising the head and carrying the straw, is formed of the arms 1—1 which are bowed outward and extend approximately half way down the straw body. The upper ends of the arms are connected to the handle 2 by the screws 3—3. Midway between the arms 1—1 is a cross arm 4 which is connected to the arms 1—1 by screws as shown, or may be made an integral part of the frame. As an additional means of strengthening the connection of the handle to the frame a clip 5 is passed around the cross arm 4 and connected to the handle 2 by screws 6 and 7.

The straw of the broom is divided into a plurality of sections 8—8 and each section has a core 9 around which the straw is placed and wrapped with cord as shown, the straw fitting into the annular groove 10, and holding the straw securely in position. Each core 9 is apertured to receive a bolt 11 which bolt traverses the cross arm 4 and has a nut 12 advanced thereon. The sections 8—8 are then stitched as at 13 to further hold them in place and a cover (not shown) may if desired be slipped over and secured in position on the frame.

To take out one of the sections 8—8 it is only necessary to remove the nut 12 and undo the stitching 13. The complete sections may be manufactured at small cost and purchased as needed.

Having thus described the nature and objects of my invention, what I claim as new and desire to secure by Letters Patent is—

A broom comprising a handle, a frame consisting of two arms with their upper ends connected to the handle and curved obliquely downwardly and outwardly, a cross arm spanning the space between and connected to the arms and to the handle, a plurality of members spaced apart and removably secured to the cross arm, said members forming a supporting means or core for a sweeping element secured to each of the cores and forming the body or sweeping portion of the broom, and means for connecting the cores comprising the sweeping units together and to each lower end of the arms.

In testimony whereof I have signed my name to this specification.

FRANK P. BLASINGAME.